United States Patent Office 3,436,910
Patented Apr. 8, 1969

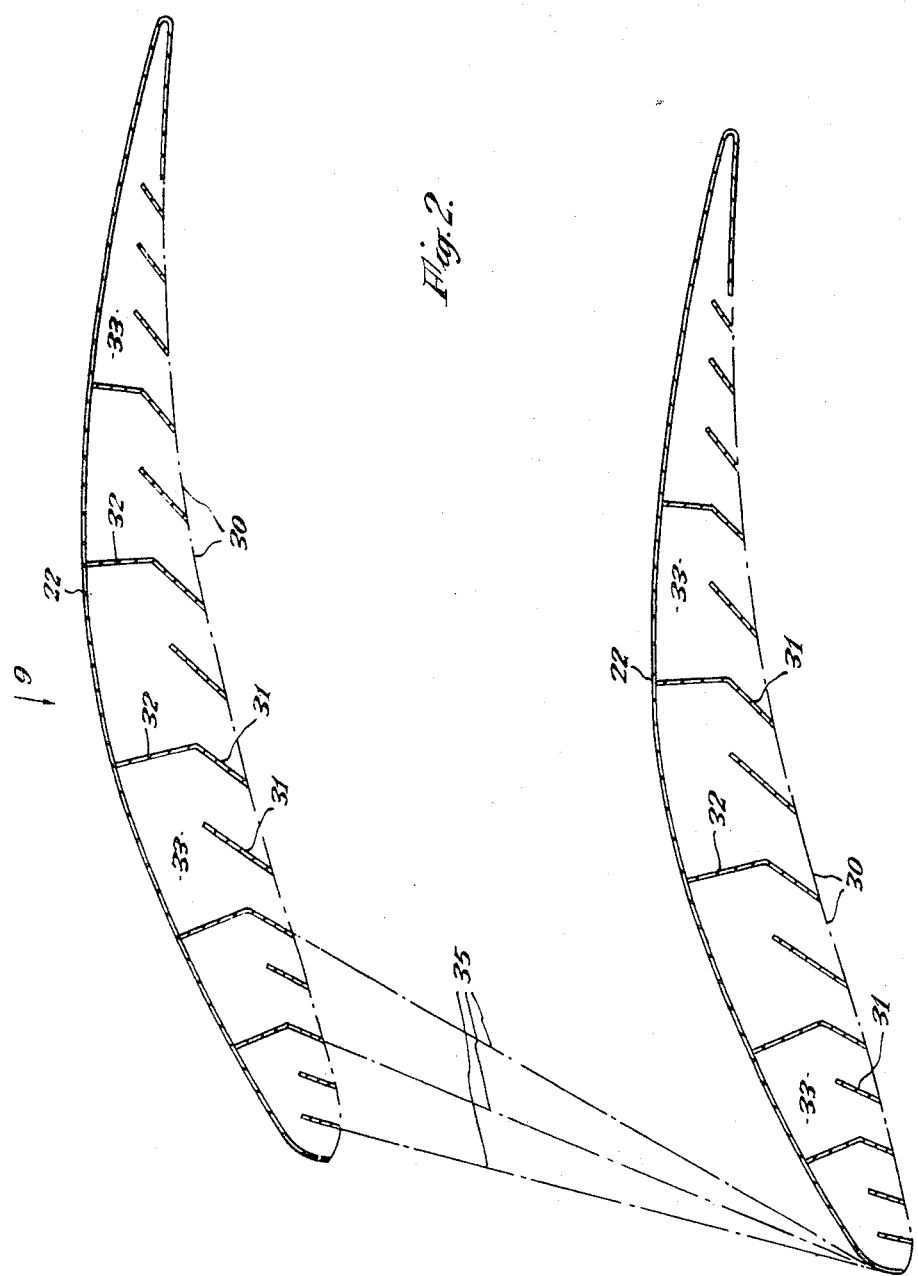

3,436,910
STRUCTURE FOR SEGREGATING FOREIGN MATTER FROM THE AIR OF AN AIR INTAKE FOR A GAS TURBINE ENGINE
Lionel Haworth, London, England, assignor to Bristol Siddeley Engines Limited, a British company
Filed June 16, 1967, Ser. No. 646,682
Claims priority, application Great Britain, June 22, 1966, 27,796/66
Int. Cl. F2c 7/04, 7/30; F16f 7/00
U.S. Cl. 60—39.09    20 Claims

ABSTRACT OF THE DISCLOSURE

The disclosure of this invention relates to an air intake for an engine, such as a gas turbine engine, which intake if annular is provided with a ring of transverse vanes having their pressure faces slotted and arranged to ingest dust particles which are then withdrawn from the vane interiors and discharged through the intake wall.

---

Figure 1:
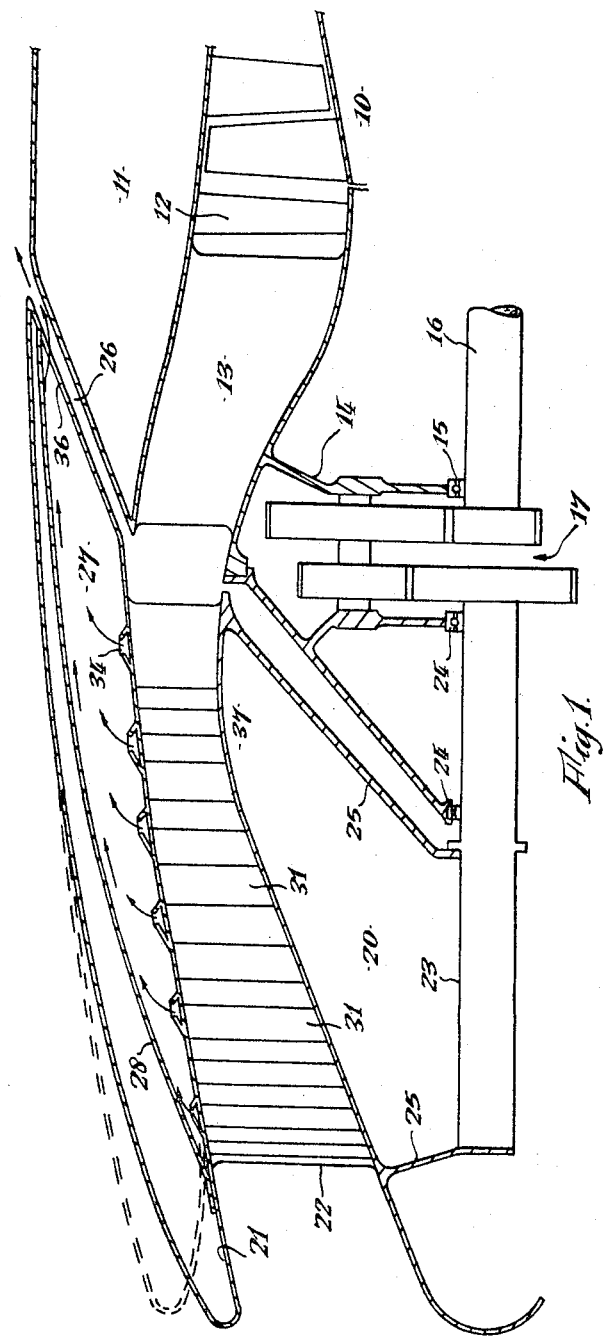

This invention relates to air intakes, particularly intakes for gas turbine engines or air compressors which are required to operate in sand or dust laden air. The invention also includes vanes for such intakes.

It has been found for example that gas turbine engines of helicopters and air cushion vehicles when operating in sandy areas ingest large quantities of sand particles which can cause severe damage to the engines. The present invention seeks to reduce the ingestion of such particles by the engine compressor.

This invention provides, in one of its aspects, an air intake comprising an intake passage, at least one hollow vane of aero-foil form which extends across the intake passage, the vane having a surface arranged to permit particle-laden air to pass therethrough, and means for enabling particles to be collected in the vane and withdrawn therefrom.

According to another aspect of the invention, an air intake for a gas turbine engine and including at least one hollow vane of aerofoil form which extends across the intake passage is characterised in that (a) The pressure face of the vane presents a plurality of spanwise slots spaced transversely across the vane, each of which slot is defined along its spanwise edges by slats which project into the interior of the vane, and (b) The interior of the vane is divided by spanwise baffles into compartments provided with outlets for the removal of particles which enter through the slots.

Where the intake is annular, it may comprise inner and outer rotatable wall sections which are connected by a circular row of such vanes, the outer ends of the vanes being provided with the outlets for the removal of the particles.

According to a further aspect of the invention, a hollow vane of aerofoil form for an air intake of a gas turbine engine has its pressure face provided with a plurality of spanwise slots spaced transversely across the vane, each of which slots is defined along its spanwise edges by slats which project into the interior of the vane, the interior of the vane being divided by spanwise baffles into compartments provided with outlets for the removal of particles which enter through the slots.

By way of example, the invention will now be described with reference to the accompanying diagrammatic drawings of which:

FIGURE 1 is a longitudinal section through part of the air intake of a gas turbine engine which is provided with a slotted vane according to the present invention, and FIGURE 2 is a cross section, on a larger scale, of two adjacent slotted vanes, the direction of rotation of the vanes being indicated by the arrow 9.

A gas turbine jet propulsion engine includes an axial flow compressor 10 arranged to rotate in a stationary double walled casing 11, a set of inlet guide vanes 12, and upstream thereof a further set of vanes 13, both sets of vanes connecting the casing 11 to stationary supporting structure 14 which carries bearing 15. The latter support a drive shaft 16 from the engine and also the adjacent part of speed reduction 17.

The engine is provided with an annular intake duct section which comprises inner and outer walls 20, 21 connected together by a circumferential series of hollow vanes 22 of aerofoil form, the whole assembly being rotatable and driven by a shaft 23 which in turn is driven through reduction gearing 17 by the engine shaft 16. The vanes 22, 13 operate as a single stage compressor. The shaft 23 is supported on axially spaced bearings 24 and connected by torque transmitting diaphragms 25 to the inner wall 20. The outer wall 21 which is double walled tapers outwards at its downstream portion and overlaps a tapered upstream portion of the casing 11, the overlapping portions being spaced apart to define an annular discharge passage 26 which is inclined rearwards and outwards. The interior 27 of the outer wall is provided with an annular deflection member 28 whose function will be described later.

Each of the vanes 22 of the rotary assembly has its pressure or concave face (indicated by a chain dotted line in FIGURE 2) formed with a series of spanwise admission slots 30 spaced transversely across the vane face. The leading and trailing edges of the slots are defined by slats 31 which extend either partially inwards into the interior of the vane or completely across the interior of the vane in order to form baffles 32 which divide the vane interior into a succession of compartments 33. Each compartment communicates with the interior 27 of the outer wall 21 through a nozzle 34 formed in its radially outer end, the nozzles serving to control the air flow which passes through them and thus also the air flow through the slots 30.

The narrow circumferential spacing of the vanes 22 is arranged to ensure as far as practicable that any particles carried by the air entering the intake are met by the slots 30 of the pressure faces of the vanes. The inclinations of the slats 31 of each vane are varied along the vane chord to suit the expected approach angles of the particles and so promote ingestion of the particles through the slots 30. For example, the paths 35 of three particles show the greatest angles of incidence likely to be encountered in practice by the vane in question and FIGURE 2 also shows how the slat inclinations are varied to minimize the risk of particles striking the downstream sides of the slats and so being reflected out of the vane. Some of the particles entering the intake may strike the edges of the slats but a proportion of these should be deflected through the slots.

The projection of the slats into the interior of each vane is designed to prevent particles which have entered the vane from escaping through the slots back into the air flowing past the vanes.

The internal baffles 32 are provided to prevent a recirculation of air within the vane such that particles entering the vane through one slot would be blown out through an upstream slot by the increase in air pressure.

Those particles which enter each vane are urged radially outwards along their respective compartments 33 by the centrifugal force of the rotating vanes until they are expelled through the the nozzles 34 into the interior 27 of the rotating outer wall. Here they are flung against the deflection member 28 which because it is rotating and diverges in the downstream sense causes the particles to slide or move rearwards and escape through porting 36 into the discharge passage 26. The main air flow passing between the particle-trapping vanes 22 is swept by the rotating vanes and any particles which escape being trapped will be exposed to the centrifuging action of the vanes which is considerable in view of their large chord. Such action is assisted by the divergent or humped portion 37 of the inner wall 20. Consequently many untrapped particles will be forced to travel towards the diverging outer wall 21, moving rearwards in or adjacent the boundary layer of air which flows over the outer wall until they reach and are forced to enter the discharge passage 26.

In operation, air entering the intake is acted upon by the rotating vane assembly and then divides, the major portion of the air changing direction inwards to pass between the stator vanes and enter the compressor 10 whilst a minor portion adjacent the outer wall 21 is centrifuged outwards through passage 26. A large proporation of any particles entering the intake are trapped in the vanes 22, centrifuged into the interior of the outer wall 21 and finally discharged into the passage 26. Other particles are swept by the rotating vaned assembly towards the outer wall 21 and are finally forced into the passage 26. The relatively clean air then turns and enters the engine.

The passage 26 may be arranged to discharge to atmosphere. Alternatively it may be arranged to communicate with a suitable low pressure area, such as for example the exhaust duct of a gas turbine engine having a power shaft driven by a low pressure turbine.

FIGURE 1 also shows in chain lines a modified form of the intake duct section wherein the outer wall 21 upstream of the centrifuging vanes 22 is made sharply convergent in order to accelerate the air flow immediately before it reaches the vanes and also during its passage between the earlier vanes. As shown, the outer wall may be inclined at about 40° to the rotational axis of the shaft 23. The vanes 22 are inclined to match the accelerated flow of the oncoming air but the particles will, by reason of their initial inertia, enter the passage between the slatted vanes at a lower axial velocity than the air and thus will follow paths which differ from the mean path of the air. The paths of the particles will be inclined towards the pressure faces of the slatted vanes at greater angles than the air and in this manner ingestion of the particles through the slots in the vanes will be promoted. As a result of the potentially increased effectiveness of the particle ingestion by the vanes, the pitch between the vanes may be increased and thus the blockage of the intake passage by the vanes correspondingly decreased.

What we claim is:

1. An air intake for a gas turbine engine and including at least one hollow vane of aerofoil form which extends across the intake passage, characterised in that
   (a) the pressure face of the vane presents a plurality of spanwise slots spaced transversely across the vane, each of which slots is defined along its spanwise edges by slats which project into the interior of the vane, and
   (b) the interior of the vane is divided by spanwise baffles into compartments provided with outlets for the removal of particles which enter through the slots.

2. An air intake according to claim 1, wherein the inclinations of the vane slats are varied along the chord of each vane to match the expected approach angles of the particles.

3. An air intake according to claim 1, wherein the intake is annular and comprises inner and outer rotatable wall sections which are connected by a circular row of such vanes, the outer ends of the vanes being provided with the outlets for the removal of the particles.

4. An air intake according to claim 1, wherein the intake is annular and comprises inner and outer rotatable mediately before it reaches the vanes.

5. An air intake according to claim 1, wherein the portion of the intake passage immediately upstream of the vanes is sharply convergent.

6. An air intake according to claim 3, wherein the vane outlets are formed as nozzles in order to control flow through the vane slots.

7. An air intake according to claim 3 and operatively connected to a gas turbine engine, wherein the intake is arranged to be rotated through a speed reduction device by a shaft of the engine.

8. An air intake according to claim 3, wherein the intake is provided downstream of the vanes with a fixed annular partition which divides the main flow passage into an inner passage which leads to the engine compressor and an outer passage for discharge of particles which extends between overlapping portions of the outer rotatable wall section and the partition.

9. An air intake according to claim 1, wherein the intake is annular and comprises inner and outer rotatable wall sections connected by a circular row of such vanes, the outer ends of the vanes being provided with outlets for the removal of particles,
   wherein the intake is provided downstream of the vanes with a fixed annular partition which divides the main flow passage into an inner passage which leads to the engine compressor and an outer passage for discharge of particles which extends between overlapping portions of the outer rotatable wall section and the partition,
   and wherein the inner rotatable wall section converges towards the outer rotatable wall section in order to apply a radially outward component of motion to the main flow before it reaches the partition.

10. An air intake according to claim 9, wherein the vane outlets connect with a chamber formed in the outer rotatable wall section, which chamber has a divergent outer wall and an apertured downstream wall which overlaps the partition and defines therewith the outer passage.

11. An air intake for a gas turbine engine comprising an annular duct defined by a radially inner and a radially outer wall, vanes of aerofoil form connected between the walls, the vanes and the outer wall being hollow, inlet openings in the pressure side of the vanes for connecting the space between the vanes to the interior of the vanes, passages connecting the interior of the vanes to the interior of the outer wall, an opening in the outer wall connecting the interior thereof to the exterior of the duct, the duct being supported for rotation about its axis for air passing through the duct to be engaged by the vanes during such rotation so that particles in the air can pass through the openings in the vanes and through the outer wall to the exterior of the duct.

12. An air intake according to claim 11, characterized in that
   (a) the pressure face of each vane presents a plurality of spanwise slots spaced transversely across the vane, each of which slots is defined along its spanwise edges by slats which project into the interior of the vane, and
   (b) the interior of the vane is divided by spanwise baffles into compartments provided with outlets for the removal of particles which enter through the slots.

13. An air intake according to claim 12, wherein the inclinations of the vane slots are varied along the chord of each vane to match the expected approach angles of the particles.

14. An air intake according to claim 11, wherein the walls are arranged to accelerate the air flow immediately before it reaches the vanes.

15. An air intake according to claim 11, wherein the portion of the duct immediately upstream of the vanes is sharply convergent.

16. An air intake according to claim 11, wherein the passages are formed as nozzles in order to control flow through the inlet openings.

17. An air intake according to claim 11 and operatively connected to a gas turbine engine, wherein the intake is arranged to be rotated through a speed reduction device by a shaft of the engine.

18. An air intake according to claim 11 provided downstream of the vanes with a fixed annular structure which divides the main flow passage into an inner passage which leads to the engine compressor and an outer passage for discharge of particles which extends between overlapping portions of the outer wall and the structure.

19. An air intake according to claim 18, wherein the inner wall converges towards the outer wall in order to apply a radially outward component of motion to the main flow before it reaches the fixed structure.

20. An air intake according to claim 18, wherein the passages connect with a chamber formed in the outer wall which chamber has a divergent outer wall section and an apertured downstream wall section which overlaps the fixed structure and defines therewith the outer passages.

References Cited

UNITED STATES PATENTS

| | | | |
|---|---|---|---|
| 1,829,674 | 10/1931 | Rosenlocher | 253—76 |
| 2,399,009 | 4/1946 | Doran | 253—76 |
| 2,831,629 | 4/1958 | Giacchino. | |
| 3,371,471 | 3/1968 | Connors | 55—306 |

FOREIGN PATENTS 663,194  12/1951  Great Britain.

CARLTON R. CROYLE, *Primary Examiner.*

U.S. Cl. X.R.

55—306; 230—132